United States Patent Office 3,491,836
Patented Jan. 27, 1970

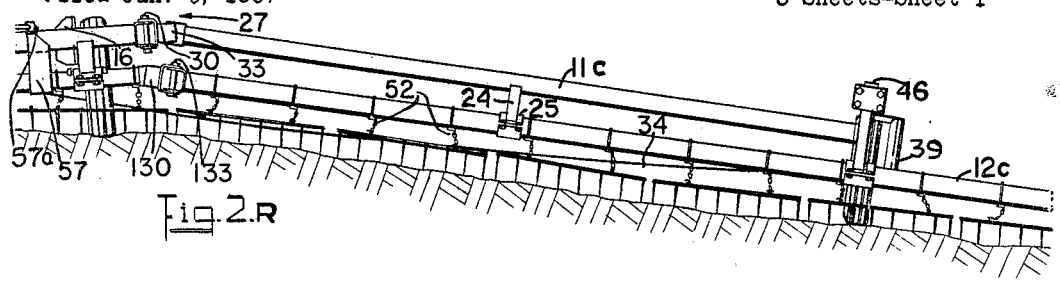
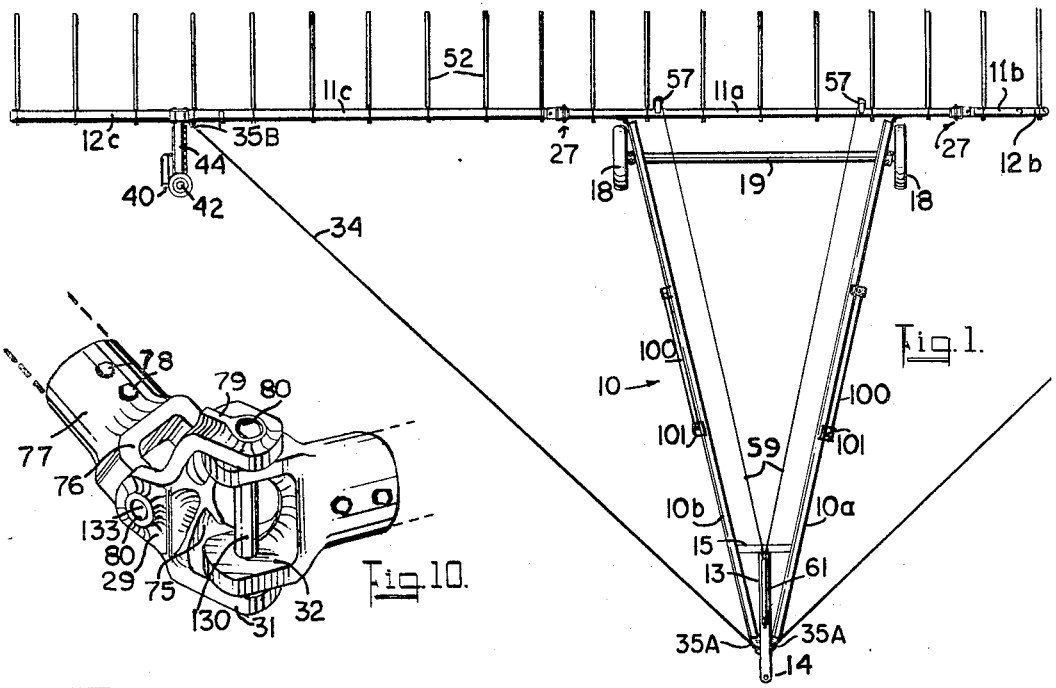
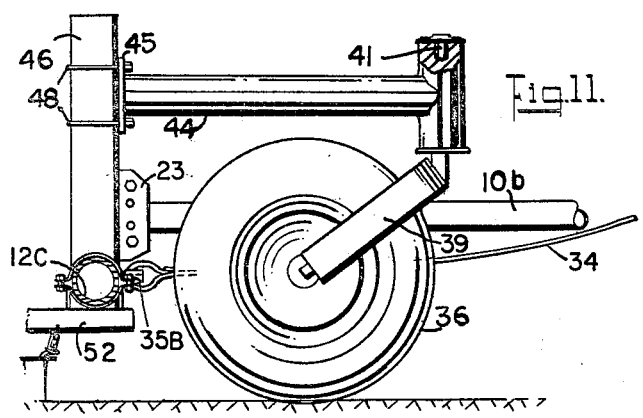

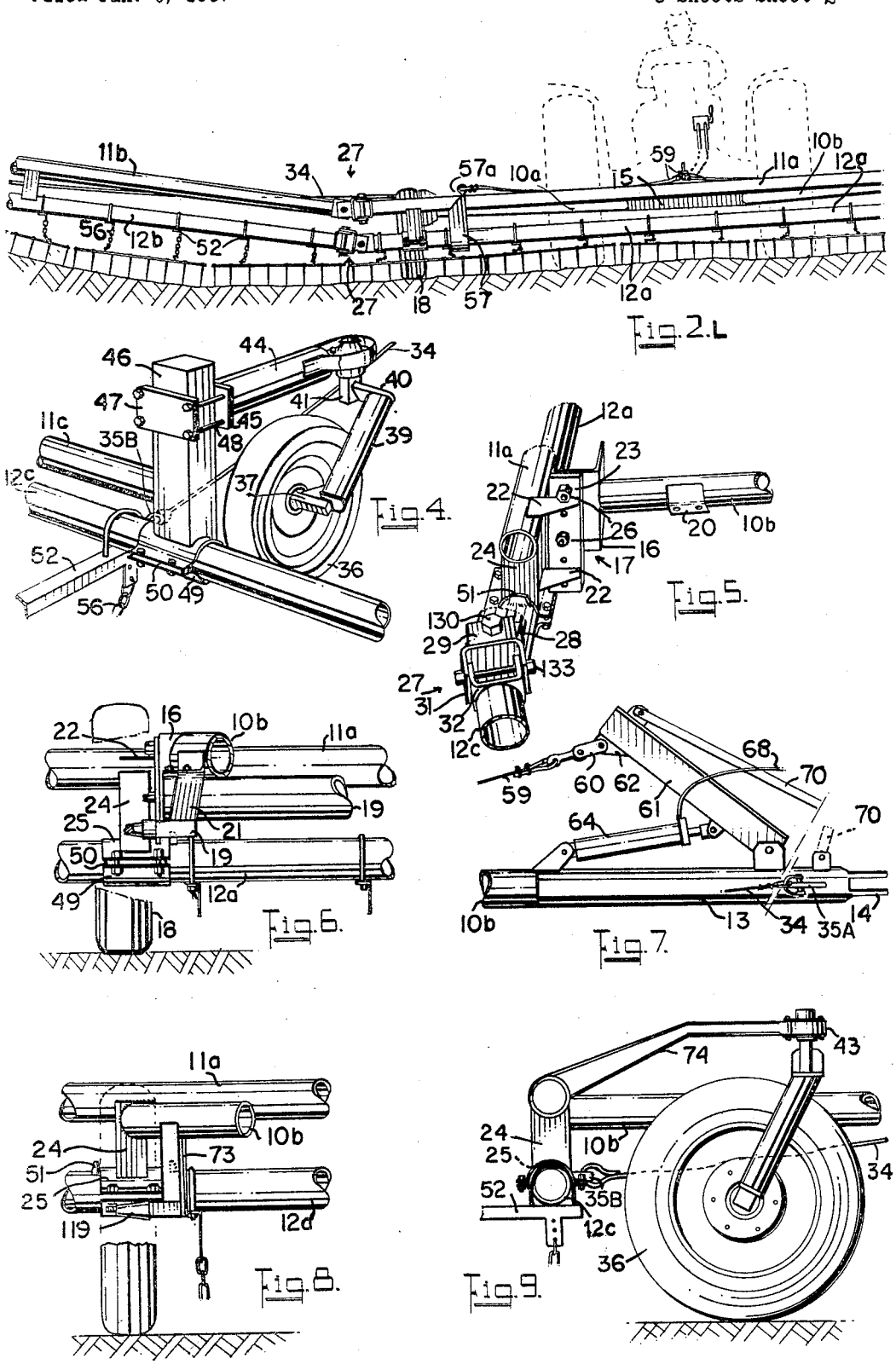

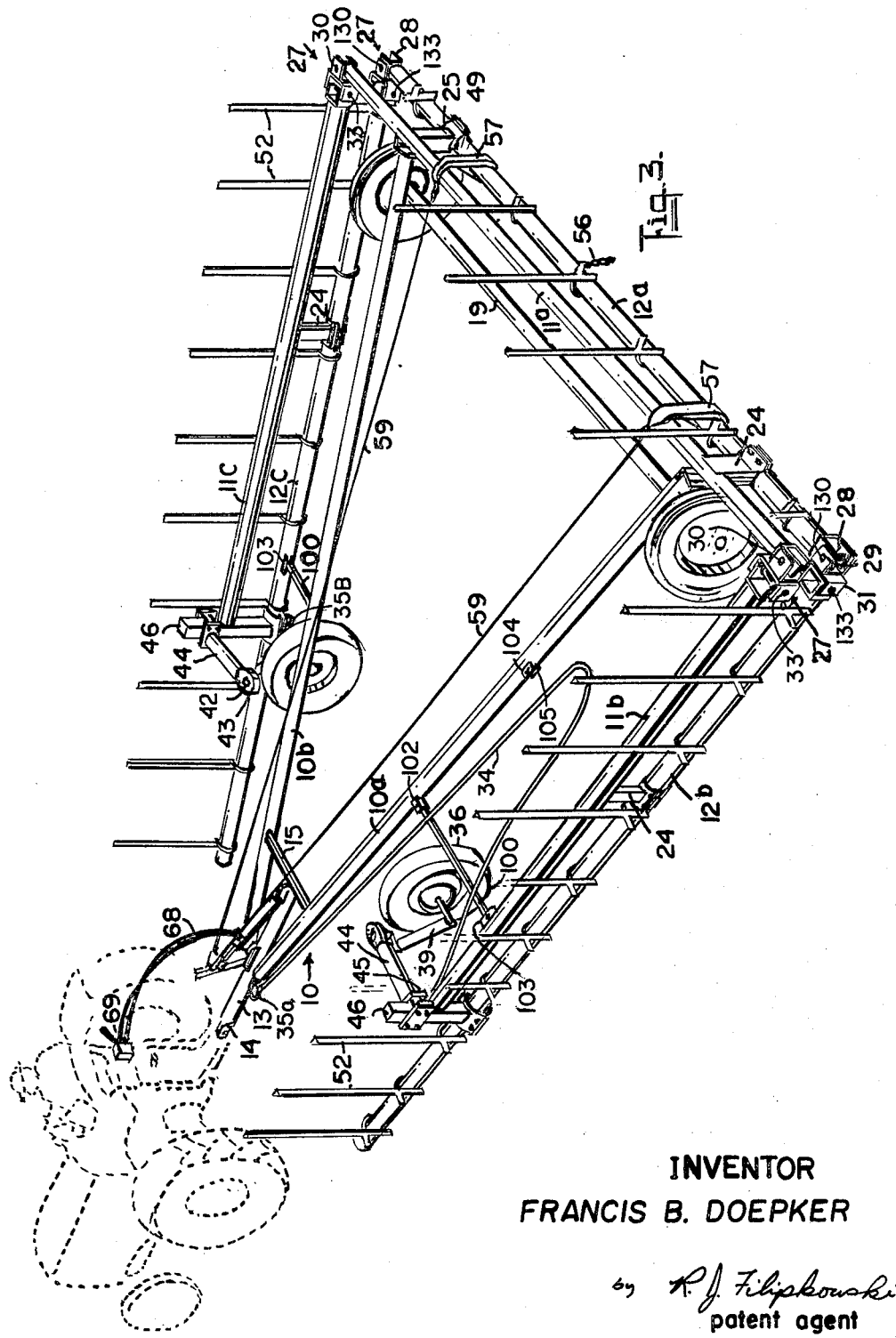

---

3,491,836
WIDE-SPAN IMPLEMENTS HAVING ARTICULATED FRAMES
Francis Bernard Doepker, Annaheim, Saskatchewan, Canada, assignor to Doepker, Industries Limited, Annaheim, Saskatchewan, Canada
Filed Jan. 9, 1967, Ser. No. 611,792
Int. Cl. A01b 49/00, 63/00
U.S. Cl. 172—311          12 Claims

ABSTRACT OF THE DISCLOSURE

An implement is described, of extremely wide span conforming to rolling land, for carrying a gang of tilling tools such as harrows in line-abreast spans in widths of 70 feet or more, wherein an articulated frame portion has a center section, and left and right wing frame sections joined with its ends by joints having vertical and horizontal axis pivots, the center frame section being carried at adjustable ground height upon the wide end of a wheeled A towing frame provided with a tractor hitch point, the wing sections being carried on outboard support wheels freely castering on the ends of forward booms fixed on the frame section ends; an articulated drawbar spaced parallel with and below the frame has a coextensive center section, longer wing sections connected by joints disposed below corresponding frame joints, and is carried in several sleeves fixed on the lower ends of short spacing posts integral with the frame sections; a hydraulic lift effects tool-raising rotation of the drawbar only, elevating hanger rods extending from the drawbar, only possible when the sections are in-line; such rotation causes the vertical pivots of the frame and drawbar joints to align in common vertical axes, whereupon each wing section may be swung horizontally into a forward roading disposition and secured by a strut to the towing frame.

---

The invention relates to towed agricultural implements for working a broad band at a single pass; the objective I have in view is to provide a foldable drawbar having very wide span, i.e. much greater than twenty-five feet, for a gang of tillage tools such as harrows and the like, and more particularly the invention consists in a three section rotatable and foldable drawbar carried in a foldable three section frame which is supported at all times by an inboard pair of fixed-axle ground wheels and by an outboard pair of castering ground wheels.

It is recognized that any agricultural implement having an extended drawbar must be capable of being readily converted from the extended operating state to a reduced width so that it may pass through gateways and be transported on roads and highways at the usual traffic speeds. When the drawbar is adjusted to its reduced width condition it must be capable of carrying the ground-working tools safely raised. It is a concomitant requirement that the structure carrying the ganged tools should be provided with adjustable powered raising and lowering means therefor, effective to lift the tools simultaneously as desired during field work, and also of erecting the tools into their carrying position. While these objectives are generally achieved in prior art folding drawbars of moderate span, many difficulties arise as the width is increased to spans of forty, fifty or even sixty feet. Solutions aimed at strengthening the structures by greatly enlarging the cross-sectional dimensions of the drawbar have not proved practicable, for reasons which will become apparent in the following remarks analysing prior art designs.

Wide-span drawbars as known heretofore have usually been supported together with their tools on a plurality of spaced ground wheels disposed in line abreast and ahead of the drawbar when in extended operating state. The practice has been to design the drawbar in three sections whereof the center section comprises part of a towing framework supported on an inboard pair of ground wheels and whose width does not much exceed twelve feet, and the wings or extensions each have an outboard supporting ground wheel fixed thereto and are end-connected with the respective ends of the center section by single-pivot joints. In the folded state the wing sections are carried entirely clear of the ground upon the towing framework so that the implement may be trailed at traffic speeds. One highly practical implement design incorporating the aforesaid features is described in my U.S. Patent No. 2,926,929 of Mar. 1, 1960, which has proved well adapted to towing ganged tools of moderate span on undulous terrain.

In some prior art folding drawbars castering outboard wheels have been employed, pivotedly connected with booms projecting ahead of the wing sections. These however have necessitated restricting the tool lift during field operation to avoid joint damage, and have required releasing and resetting the boom whenever the drawbar is rotated into transport position or into operating position.

As the span of the implement is widened, so that the load of tools carried and drawn by the structure is increased, difficulties are encountered in handling, operating and transporting the implement. While the lengths of the wing drawbar sections may be increased considerably, it is impossible to extend the center section beyond the usual highway lane width; consequently the construction of a drawbar for harrowing or tilling a span of the order of fifty or sixty feet necessitates the use of far stiffer and heavier wing sections and pivots, and the adoption of novel arrangements for rigidifying both the center frame and the wing sections. In some designs the load on the hitch end becomes excessive. Moreover the load carried by the center section wheels is large so that for safety at highway speeds, stronger axles, wheels and fittings are required, adding to the cost. The stress developed in a single-pivot joint between drawbar sections whenever the center drawbar section is rotated while one or both of the wing sections are deflected out of axial alignment with it by even a few degrees can be excessive unless the sections are light enough to yield by flexing and twisting. The heavier, large-diameter sections necessitated by the wider span implements therefore demand that joints be greatly enlarged and strengthened. Even with the heavier tubular sections it has been found that control of the tillage tools is inadequate, resulting in slewing and swinging.

I have found that the defects and disadvantages noted above are avoidable by following entirely different consructional and design concepts in an extended span implement according to the present invention, wherein the implement is constructed as an articulated wheeled support framework for carrying the drawbar sections suspended in the framework and provided with independent universal couplings. According to this concept the framework comprises a rigid wheeled center frame member and a pair of wheeled extension frame members connected with the ends of the center frame member by joint means having two axes mutually at right angles to each other and to the axis of the transverse frame member, and the drawbar is carried parallel with and spaced below the framework sections and comprises three end-connected sections joined by universal-jointed couplings identical with the couplings joining the framework sections, each drawbar coupling being disposed below the corresponding framework section coupling. As none of the wheels are carried directly on a drawbar section, it may be freely rotated about its longitudinal axis in the operating position.

A wide-span three section drawbar implement according to the invention is specifically realized by providing a triangular towing framework of isoceles plan form having a transverse center frame section carried by the ends of the side-forming members of the towing triangle and being vertically adjustable with respect thereto, the towing triangle being provided with a hitch at the apical forward point; left and right wing frame sections are connected in end-to-end relation with the center section by universal joint means permitting relative pivoting movement of the wing frame sections with respect to the fixed center frame section about a vertical axis and about a longitudinal axis in respective pivots laterally spaced in the joint; the triangular framework is carried by a pair of ground wheels disposed at the sides of the towing triangle ahead of the center frame section and journalling on the ends of a transverse brace carrying the implement; and each wing frame section is carried at its outward end by a castering ground wheel disposed on a forwardly projecting boom fixed on the end of the section, and is supported by its ground wheel for all frame positions including extended and folded positions. The draft load of the center drawbar sections is transferred from the towing frame by robust sleeves spaced below the center frame section, while inextensible tension members such as cables or chains extend between the forward end of the towing framework and respective attachment points on the right and left wing sections of the drawbar, to maintain the drawbar sections aligned when towing tools while being free to adjust to undulous terrain by swinging in the vertical plane about longitudinal horizontal joint axes.

To fold the implement, the drawbar is first rotated as in prior art implements, to raise the tool support framing by powered means such as a hydraulically actuated piston-and-cylinder linear motor carried in the towing framework and linked with lever arms fast to the center section of the drawbar. Thereupon, the outer end of each drawbar is swung forwardly by rolling the castering outboard wheels ahead and inwardly along an arcuate path until the tubular wing frames and associated wing drawbar sections are brought into forwardly extending relation, whereupon they are locked to the towing framework. In this state each of the four ground wheels still carries substantially the same load as when the implement was in extended state.

The invention may be the more fully understood in its principles and practice from a study of the following description of preferred embodiments as shown by the accompanying drawings, wherein, FIGURE 1 is a plan view of an operating implement constructed according to the invention having a very wide span draw bar, the end portions of the left wing sections of the frame and the drawbar being omitted;

FIGURE 2 is a rear elevation view of the implement of FIGURE 1 operating on undulating terrain, showing attached harrow sections towed from the drawbar; views 2L, 2R are shown;

FIGURE 3 is a perspective view, looking down on and from the left rear of the implement which is shown in its folded transport configuration with tools removed and tool supports partly cut away;

FIGURE 4 is a perspective view showing the support bearing for the wing frame and height adjustment, seen from above and to the rear;

FIGURE 5 is a perspective view looking down on the right end of the center frame of the implement showing means for adjusting the height relative to the towing frame;

FIGURE 6 is a view from the front of the implement showing the wheel mounting and attachment of the towing frame to the center frame;

FIGURE 7 is a side elevation view of the forward end of the implement showing mounting of a hydraulic actuator for raising and lowering of earth tilling tools, indicating in dotted outline the actuator arm position when tools are in the raised position;

FIGURE 8 is a frontal view similar to that of FIGURE 6 showing an alternative center frame and fixed wheel support;

FIGURE 9 is a side elevation view of the outboard end of a wing frame and drawbar showing a fixed wheel support for the implement of FIGURE 8;

FIGURE 10 is an enlarged perspective detail of an alternative joint assembly for very heavy tool gangs; and FIGURE 11 shows an alternative design of boom and caster pivot structure for an outboard wheel.

Referring to the drawing, a wide-span drawbar implement according to the invention comprises the three portions consisting of a forward triangular towing framework generally designated 10, an articulated three-section tubular frame having center section 11a and left and right wing frame sections 11b and 11c, and an articulated three-section drawbar having center drawbar section 12a and left and right wing drawbar sections 12b and 12c.

The towing framework 10 is comprised of similar elongate side members 10a and 10b connected at their forward ends with a longitudinal pull tube 13 extending forwardly to a hitch point 14, the side members being braced by a transverse channel 15 attached at its midpoint with the rearward end of the pull tube. The rearward ends of side members 10a and 10b are secured to the forward faces of upright angle section members 16, the side faces of which are bolted to vertical mounting bracket assemblies 17.

The towing framework 10 is carried by a pair of ground-engaging inboard wheels 18 journalled on the ends of a fixed axle pipe 19 which extends under both side members spaced ahead of their rearward ends, the axle being secured to the side members by brackets 20 fixed as by welding on their outer sides, the brackets being bolted to seats 21 formed with upper flat surfaces and fixed adjacent the ends of the axle pipe.

The bracket assemblies 17 are secured to the center frame section 11a adjacent the ends thereof on its forward side, and include horizontal bracing gusset plates 22 respectively joining the upright bar 23 with the center frame section and with erect posts 24. Each post 24 is strongly secured by its upper end to the lower surface of the center frame section near an end thereof, and carries fixed on its concavely-shaped lower and the upper semi-cylindrical shell 25 of a drawbar beairng assembly 26. The side face of vertical angle section 16 is pierced by a vertical line of mounting holes 16A, receiving bolts 16B which pass through holes of a matching vertical series in the upright bar 23. Consequently the height of the center frame section 11a, and hence of the center drawbar section also, can be set by fitting appropriately angle 16 to bar 23 and bolting at the selected height position. Such variation accommodates a range of tillage tools.

The wing sections 11b and 11c of the folding frame which extend from the ends of the center frame section are connected therewith by assemblies of pivot bolts and U-shaped fittings, these assemblies hereinafter being referred to as "joints" 27. Each joint comprises a first U-fitting 28 having its base strongly secured to the end of the center frame section 11a with the arms of the U disposed in the horizontal but being vertically spaced; a second U-fitting 29 also having its arms in vertical spaced relation fits over the arms of the first U-fitting, and the four arms are linked by a common vertical pivot bolt 30 passing through closely-fitting holes drilled through the arms permitting hinging; the base of the second U-fitting is secured in back-to-back relation with the base of a third U-fitting 31 having its arms spaced laterally and extending in a direction opposite to the arms of the U-fitting 29; and a fourth U-fitting 32 having its arms spaced laterally and received between the arms of U-fitting 31 has its base secured on the end of a wing frame section 11b or 11c; U-fittings 31 and 32 being linked by a common horizontal pivot bolt 33 passing through closely fitting holes drilled in the four arms, permitting vertical swinging.

It will be seen that each joint provides free articulation of its wing frame section in any direction relative to the center frame section, and when the proportions of arm width, length and thickness are suitably chosen the wing frame sections may be folded by swinging about their vertical pivots forwardly through an angle greater than a right angle, and will be free to swing up and down to accommodate any variations from the level encountered in the land.

In the operating position each frame assembly is held with the sections aligned as viewed in plan, FIGURE 1, by means of tension members such as cables or chains 34, secured by their forward ends to lugs 35A adjacent the hitch point 14 in towing frame 10, and secured by their rearward ends in eyes 35B carried by the drawbar. As will be seen from FIGURE 2, the tension members may be in certain extreme conditions be nearly in contact with the ground surface and accordingly are made as smooth as possible to avoid loading with weed growth or stalks.

The outboard end of each of the frame sections 11b and 11c is supported by respective ground wheels 36, the axles 37 of which are journalled in wheel hubs 38 and are fixed on supporting struts 39. The struts are spaced a few inches from the side of the wheel and are inclined upwardly forwardly, being connected to laterally offset member 40 at their upper end extending parallel with the wheel axle. Member 40 in turn is fixed on the lower portion of a vertical axle 41 whose axis lies in a common vertical plane bisecting the wheel 36, and is journalled in a hub 42 mounted in a hub carrier 43. The latter is fixed on a short tubular stand-off 44 having a rigid base plate 45 at the end remote from the carrier and is adjustably mountable on an upright post 46 of rectangular, square, or other suitable cross sections. The outer end of a wing frame section such as 11c shown in FIGURE 4 is fastened rigidly to the inward-facing side of the post about ten inches above its lower end. The post extends a foot or two above the frame, providing for a considerable range of height adjustment when the base plate 45 is clamped thereon by means of bolts 48. For the flat-sided post as illustrated a backing plate 47 disposed on the side opposite to the base plate is engaged by the bolts.

In one practical construction providing adequate clearance between the underside of stand-off 44 and the outboard wheel, as well as forward clearance relative to the frame section, the top of the post should be not less than about three feet above ground, assuming conventional wheels with pneumatic "implement" tyres are employed.

The center section 12a and both wing sections 12b and 12c of the drawbar are each carried in spaced relation below the center and wing frame sections corresponding therewith, being supported in two-piece bearing assemblies 26 comprising upper semi-cylindrical shell 25 and lower semi-cylindrical shell 49 bolted together on spacer bars 50. No restraint is provided for the wing drawbar sections so that the latter may turn and slide axially freely in the bearings, as required when the wing sections deflect up or down from axial alignment with the center section. For very long drawbars, a pair of posts and bearings may advantageously be provided as shown, one post and bearing being located intermediate the ends of the frame section. Axial restraint must however be provided for the center drawbar section, by forming lugs 51 as may be seen from FIGURES 5 and 6, which are secured on either or both sides of the shells.

Joint members identical in all respects with those described for the attachment of the wing frame sections to the center frame are provided for connecting the wing drawbar sections with the center section, and include an inner pivot bolt 130 nearest the center drawbar section and outer pivot bolt 133 nearest the wing drawbar section. When the implement is folded as shown in FIGURE 3 for transport, the vertical pivot bolts 30 and 130 are aligned, and the horizontal pivot bolts 33 and 133 lie in vertically superposed spaced relation. When the pivots are disposed in the relation just described the folding operation does not cause substantial axial movement of the outboard bearing shells relative to the drawbar while the wing sections thereof are being manually swung into position. The freely castering outboard wheels will take up a position as shown with the ground contact point behind the axis of vertical axle 41.

It will be apparent that the major part of the weight of the wing sections will be carried by the outboard wheels so that the load on the hitch point 14 is unaffected by the position of the wing sections, and will generally be well within the load that the operator may handle with ease.

The spaced parallel tool-carrying arms 52 extend generally parallel with the pivot bolts 130, and in their lowered position are horizontal and spaced above the land so that tool sections such as harrows 54 as shown in FIGURE 2 may be dragged from them when attached by short links such as chains. It is to be understood that harrows are illustrative of light-draft tilling tools, but many other soil-tilling devices may be carried in laterally spaced relation, either abreast or staggered, for which arms 52 may be suitably modified. To accommodate units such as diamond frame spike tooth harrows, drop bars 55 are affixed below arms 52, carrying attachment chains 56. When the drawbar is rotated with the sections extended along a substantially straight line, and the carrying arms 52 are raised to their upright positions, pivot bolt 130 is vertical and bolt 133 is horizontal, corresponding respectively to the attitudes of frame joint pivot bolts 30 and 33 which lie directly above.

The rotation of the drawbar, particularly when a full set of heavy tillage tools are to be raised clear of the ground, necessitates application of large torque. The turning effect is provided by lever arms 57 fixed strongly to the center drawbar section and extending parallel with the carrier arms 52, and having end portions 57A turned up at right angles to stand clear above the center frame section when the arms are parallel to the ground. Braces 58 are connected between the front of the drawbar and the lever arm to increase the strength of the attachment for the arm on the drawbar. Tension cables 59 are attached by their rearward ends to the lever arm portions 57A and extend forwardly over the frame section to a bridle 60 by which the forward ends of the cables are connected together and with an actuator arm 61 by way of bracket 62. The lower end of actuator arm 61 is pivotedly held in lugs 63 erected from pull tube 13, to permit the arm to swing and thereby to actuate lever arms 57. A hydraulic motor 64, preferably of the double-acting piston-and-cylinder type, is mounted pivotedly in a bracket 65 fixed on the pull tube and spaced rearwardly of lugs 63 and has its piston rod connected to a pivot 66 journalled in the bracket 67 fast to the arm. Suitable hydraulic lines 68 are provided to supply fluid to and to receive fluid from the motor, under control of a suitable valve assembly 69 which will usually be fitted adjacent the operator's position on a tractor when towing the implement; such control arrangement is well known in the prior art, and is employed to raise arms 52 as much as needed to clear accumulated trash, following which they are lowered, or to fully raise and hold the arms vertical preparatory to folding.

A holding arrangement shown in FIGURE 7 is provided to lock the arm 61 in erected position for transport or storage, when the motor may be removed, comprising a bar or strap 70 pivotedly connected by one end to a lug 71 on the actuator arm and adapted to be releasably pinned by its lower end to the pull tube adjacent the hitch point in lug 72. The latter may be anywhere along the towing frame, but for simplicity and facility is preferably just back of the hitch.

It is impossible to lower the tools while the implement is folded, since the arms of those U-fittings engaged by pivot bolts which are in the vertical are at right angles, and interfere. However when the wing sections have been swung so that the drawbar extends in a straight line or even within about ten degrees from straightness, the hydraulic motor or the holding bar 70 is required to avoid dropping the tool gang.

When the implement is prepared for road transport in its folded state, no support need be provided for the wing sections by the towing frame 10, other than some means to maintain the outboard wheels at a suitable spacing therefrom. Such means may take many forms, and may comprise a removable strut 100 connected between a lug 101 on each wing section of the drawbar and a lug 102 carried by each side member of the towing framework. Such strut may comprise a tube or channel or other section providing column strength adequate to resist forces tending to swing the wing sections and having suitable quick-detachable attachment means 103 on its ends. The strut may be folded back along the side member when not in use, its rearward end being retained on a pin 104 in a lug 105.

To fold each wing section, the tool-carrying arms 52 are first aligned with the vertical and, if the implement stands on hard level ground, the operator may then manually swing the sections into the fore-and-aft position. Cables or chains 34 are simply allowed to lie slack until the swing is completed, then may be hung on elevated parts of the implement in any suitable manner as convenient. If, as is usual, the implement stands on tilled land and is loaded with a tool gang, tractor power will effect the folding, if the operator tows the implement ahead making a sharp turn to one side, causing the wing sections on that side to fold, whereupon they are secured in roading position, and the other wing sections are similarly folded by an opposite turn.

The implement when folded trails well even at highest road speeds without whipping or lateral shaking, provided the joints are not badly worn and tools are well secured. Under certain conditions of road surface, tire wear, and frame looseness, possibly assisted by wind eddies, the outboard castering wheels may tend to oscillate about their vertical pivot axles 41; the condition is more likely to occur when the hubs 42 are fitted with high quality antifriction bearings, and may be simply corrected by providing any sort of restraint to the oscillation, particularly increased bearing friction at the castering pivot. The alternative vertical axle arrangement shown in FIGURE 11 provides for steady trailing of the castering wheels 36, by journalling the vertical pivot axle 41 in the bore 90 of an elongate tubular housing 43, either with minimal lubrication, or with highly viscous lubricant.

The implement may be constructed as a fixed frameheight structure as shown in FIGURES 8 and 9, particularly if the range of height of the tools used therewith can be accommodated by adjustments of the tool suspension links. In the alternative embodiment illustrated the rearward ends of the towing members 10a, 10b are fixed directly on the posts 24, and in place of the common axle carrier 19 spanning these members as shown in FIGURE 6 each carries a stub axle 119 fixed on a depending strut 73. These stub axles journal in the hubs of inboard wheels 18. A cantilever member 74 is fixed by one end permanently to the outer end of the wing frame section to extend ahead and above the level of the frame and at a height sufficient to clear the ground wheel 36, carrying hub carriers 43.

In its folded, transport state when the struts 100 are of a length such that the wing frames are substantially parallel, sharp turns may be made without risk of interfering with the tractor, provided the length of the towing frame is within four or five feet of the length of a wing drawbar section.

While the joints have been described in the foregoing as weldments fabricated from bar steel stock, permanently fixed on the ends of the tubular center and wing section members, other designs may be employed provided these have adequate strength and rigidity so as to be capable of transferring the torque on the drawbar needed to raise a full complement of tillage tools. When the drawbar supports heavier tools such as ganged cultivators, discs, rotary hoes or land packer drums, the joints obviously must be stronger. One suitable alternative joint for heavy drafts and load applications is shown in FIGURE 10, and comprises a unitary forged center member 75 cooperating with end members 76. The latter have tubular prolongations 77 adapted to be pressed on or otherwise closely fitted on the ends of the tubular drawbar sections, and a number of through bolts 78 by which the attachment may be made secure while allowing of disassembly. The pivot pins 130 and 133 are hardened steel and are retained in bosses 79 of the center member by springs rings 80.

I claim:

1. A foldable implement for towing a wide-span gang of earth tillage tools comprising the combination with an elongate towing frame having a hitch located forwardly and a pair of fixed-axle ground engaging wheels located rearwardly therein, of a transverse drawbar-support frame including a center frame section carried rearwardly of said ground engaging wheels in said towing frame and spaced above ground and left and right elongate wing frame sections articulatedly connected with the ends of said center frame section by universal joint means permitting folding of said wing frames in the horizontal plane and pivoting in vertical planes with respect to said center frame section, ground engaging caster-wheeled pivoting structure supporting the outer end of each said wing section, an elongate foldable drawbar comprising a center drawbar section coextensive with said center frame section and left and right wing drawbar sections articulatedly connected with said center drawbar section by universal joint means permitting folding of said wing drawbar sections in the horizontal plane and pivoting in vertical planes with respect to said center drawbar section, support means fixed to each said frame section for holding a corresponding section of said drawbar revolubly therein and in spaced parallel relation under the said frame section, the support means holding said wing drawbar sections permitting limited axial movement, tool-support arms projecting from said drawbar sections parallel with each other, link means connected between said towing frame and each wing drawbar section to resist rearward swing of said drawbar sections beyond extended aligned relation with said center drawbar section, and means to rotate said drawbar about its longitudinal axis in said support means to position said tool-support arms in selected attitudes between a lowered position for drawing tools along the ground and an erected position for transport of tools.

2. An implement as set forth in claim 1 wherein said drawbar-support center frame section is adjustably secured on said towing frame to vary the height of said drawbar, and wherein each said drawbar-support wing frame section includes an upright terminal post and the outer end of each frame section is fixed to a side of said post, a depending portion of said post terminating in a support sleeve for a drawbar wing section, wheel-supported boom means adjustably secured by one end along an upwardly extending portion of said post and including bearing means formed in the other end of said boom pivotally carried on said caster-wheeled pivoting structure.

3. An implement as set forth in claim 2 wherein said frame sections and said drawbar sections are tubular and wherein said towing frame is carried by a transverse member located forwardly of said center frame section and the outer ends of said transverse member carry said fixed-axle ground engaging wheels inwardly of and adjacent to the ends of said center frame section.

4. An implement as set forth in claim 3 wherein said boom and caster-wheeled pivoting structure project forwardly a distance such that when said drawbar sections are in alignment with each other the rotational axes of all said ground engaging wheels are substantially aligned.

5. An implement as set forth in claim 2 wherein disconnectably connectable strut means are provided between said towing frame and each said drawbar wing section to maintain said drawbar-support wing frame sections and said drawbar wing sections folded forwardly for transport of said implement in a reduced width configuration.

6. An implement as set forth in claim 4 wherein said castering wheels have their vertical pivot axes disposed forwardly of their rotational axles and in the vertical plane of the wheel.

7. An implement as set forth in claim 2 wherein said means to rotate said drawbar comprises a pivoting powered lever arm mounted forwardly in said towing frame and said center drawbar section includes spaced actuator arms fixed to and projecting from said center drawbar section to the same side as said tool-support arms, and further comprises bent terminal portions of said actuator arms extending upwardly beyond the upper side of said drawbar-support center frame section when said tool-support arms are in lowered position, and wherein said actuator arms are connected by their outer ends with link means disposed above said center sections and connecting with said pivoting powered lever arm.

8. An implement as set forth in claim 3 wherein said towing frame is triangular and comprises side members joined by forward ends with said hitch and connected adjacent their rearward ends by said transverse member, and further comprises connecting means detachably securing said drawbar-support center frame section on the rearward end of each said side member, said connector means comprising a first vertically-aligned bracket fixed on the rearward end of each side member and an upright post joined to said drawbar-support center frame section by its upper end and having its lower end formed as a sleeve in which the drawbar center section is removably received revolubly therein, and a second bracket fixed forwardly on the side of said post and adjustably connectable with said first bracket therealong.

9. A foldable implement for towing a wide-span gang of earth tillage tools comprising an elongate towing frame having a pair of fixed-axle ground engaging support wheels rearwardly located and a hitch forwardly located therein, a transverse drawbar-support center frame section rearwardly mounted on said towing frame spaced above ground, left and right elongate drawbar-support wing frame sections articulatedly connected with the ends of said center frame section by pivoted joint means providing for rotation of each wing frame section about a first pivot axis which is horizontal and a second pivot axis which is vertical, said pivot axes being at right angles to the length of said center frame section, a castering ground wheel supporting the outer end of each said wing frame section, an elongate foldable drawbar comprising a center section coextensive with said center section of said drawbar-support frame and left and right wing drawbar sections articulatedly connected with said center drawbar section by pivoted joint means providing for rotation of each wing drawbar section about a third and a fourth pivot axis, said third and fourth pivot axes being mutually at right angles and at right angles to the length of said center drawbar section, support means fixed to and below each said drawbar-support frame section for holding a corresponding section of said drawbar revolubly therein in spaced relation above ground, link means connecting the drawbar wing sections with said towing frame to maintain said drawbar sections extended in line under towing load, tool-support arms projecting from said drawbar sections, means to rotate said drawbar in said support means effective to position said tool-support arms between a lowered position for engaging attached tools with the ground and raised positions whereby the tools are lifted clear of the ground, said second and said fourth pivot axes being in vertical alignment when said tool-support arms are in fully erect position whereby said wing sections of said drawbar-support frame and of said drawbar may be folded in the horizontal plane about said second and fourth pivot axes to effect a reduction of width of said implement for transport purposes.

10. A foldable implement as set forth in claim 9, wherein said towing frame is triangular and comprises tubular side members connected forwardly with said hitch and joined rearwardly by a transverse axle-support member carrying said side members and terminating in fixed axles for said ground engaging wheels disposed ahead of said center frame section, connector means carried by the rearward ends of said side members, and means adjustably securing said connector meas with respective support means carried by said center frame section to provide height adjustment for said drawbar center section.

11. A foldable implement as set forth in claim 10 wherein said wing drawbar sections extend laterally beyond the ends of said wing drawbar-support frame sections, and a horizontal forwardly extending boom is connected with the end of each wing drawbar-support frame section above a terminal support means for said wing drawbar section, said terminal support means comprising a post and said boom being detachably attached to said post in adjustable height relation, the outer end of the boom being carried on caster-wheeled pivoting support structure pivotally journalled therein.

12. A foldable implement as set forth in claim 11 wherein said pivoted joint means each comprise four U-shaped fittings having parallel opposed arms, the fittings being arranged as pairs having their arms extending respectively inside and outside the arms of the paired fitting and joined by a transverse pivot pin containing said pivot axes, and the bases of one U-fitting of each pair being crossed in back-to-back integrally joined relation, said second pivot axes being disposed inwardly along said center frame section from said first axes.

References Cited

UNITED STATES PATENTS

| | | | |
|---|---|---|---|
| 2,926,929 | 3/1960 | Doepker | 172—456 |
| 3,333,645 | 8/1967 | Gustafson | 172—311 XR |

FOREIGN PATENTS 208,782  1/1956  Australia.

ROBERT E. PULFREY, Primary Examiner

R. C. HARRINGTON, Assistant Examiner

U.S. Cl. X.R.

172—456; 280—412